(12) United States Patent
Kawamura

(10) Patent No.: US 9,509,079 B2
(45) Date of Patent: Nov. 29, 2016

(54) ASSEMBLING STRUCTURE OF ELECTRONIC COMPONENT, ELECTRICAL JUNCTION BOX, AND ELECTRONIC COMPONENT

(71) Applicant: Yazaki Corporation, Minato-ku, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/851,325

(22) Filed: Sep. 11, 2015

(65) Prior Publication Data

US 2016/0006159 A1 Jan. 7, 2016

Related U.S. Application Data

(63) Continuation of application No. PCT/JP2014/056700, filed on Mar. 13, 2014.

(30) Foreign Application Priority Data

Mar. 15, 2013 (JP) ................................. 2013-052594

(51) Int. Cl.
*H01R 13/436* (2006.01)
*H01R 9/22* (2006.01)
(Continued)

(52) U.S. Cl.
CPC .......... *H01R 13/4362* (2013.01); *H01H 50/04* (2013.01); *H01R 9/223* (2013.01);
(Continued)

(58) Field of Classification Search
CPC .. H01R 13/514; H01R 9/2458; H01R 9/223; B60R 16/0239; H01H 45/14

USPC ............ 439/524, 540.1, 845, 849, 850, 595, 439/76.2, 620.27, 949
See application file for complete search history.

(56) References Cited

U.S. PATENT DOCUMENTS 8,029,318 B2 * 10/2011 Namiki ................. H01R 24/30
439/106
2013/0043971 A1 2/2013 Chen et al.
(Continued)

FOREIGN PATENT DOCUMENTS

| JP | 55-057946 U | 4/1890 |
| JP | 2004-336973 A | 11/2004 |
| JP | 2010-221787 A | 10/2010 |

OTHER PUBLICATIONS

International Search Report for PCT/JP2014/056700 dated Jun. 10, 2014.

*Primary Examiner* — Abdullah Riyami
*Assistant Examiner* — Justin Kratt
(74) *Attorney, Agent, or Firm* — Sughrue Mion, PLLC

(57) ABSTRACT

An assembling structure of an electronic component includes an electronic component including a component main body having a plurality of lead terminals protruding from side surfaces of the component main body, and a housing member in which the electronic component is inserted and accommodated and which holds a plurality of terminal fittings connected to the lead terminals. Each lead terminal includes a base end protruding from at least one side surface of the component main body and a connecting portion which is connected to the base end and which droops along the side surface, and the plurality of lead terminals are provided to be protruded from at least one side surface of the component main body in the width direction of the side surface. The side surface of the component main body is provided with an insulating member.

12 Claims, 10 Drawing Sheets

(51) Int. Cl.
    *H01R 13/514*   (2006.01)
    *H01R 9/24*     (2006.01)
    *H01H 50/04*    (2006.01)
    *B60R 16/023*   (2006.01)
    *H01H 45/14*    (2006.01)

(52) U.S. Cl.
    CPC ......... *H01R 9/2425* (2013.01); *H01R 9/2458* (2013.01); *H01R 13/514* (2013.01); *B60R 16/0239* (2013.01); *H01H 45/14* (2013.01); *H01H 50/048* (2013.01)

(56) References Cited

U.S. PATENT DOCUMENTS

2014/0106580 A1\* 4/2014 Sato ............... B60R 16/0239
                                                      439/76.2
2015/0155121 A1\* 6/2015 Kawamura .......... H01H 50/048
                                                      439/722

\* cited by examiner

ASSEMBLING STRUCTURE OF ELECTRONIC COMPONENT, ELECTRICAL JUNCTION BOX, AND ELECTRONIC COMPONENT

CROSS-REFERENCE TO RELATED APPLICATION

This application is a continuation application of International Application PCT/JP2014/056700, filed on Mar. 13, 2014, and designating the U.S., the entire contents of which are incorporated herein by reference.

BACKGROUND OF THE INVENTION

1. Field of the Invention

The present invention relates to an assembling structure of an electronic component, an electrical junction box including the assembling structure, and an electronic component, and more particularly, to an assembling structure of an electronic component provided to an electrical junction box which is mounted on a mobile object such as an automobile.

2. Description of the Related Art

In general, a mobile object such as an automobile is equipped with an electrical junction box in which an electronic component such as a relay is accommodated to control connection between a power supply device and the electric component (see Japanese Patent Application Laid-open No. 2010-221787).

FIG. 12 is a longitudinal-sectional view of a conventional relay module.

As illustrated in FIG. 12, the conventional relay includes a relay main body 11 formed in a rectangular parallelepiped shape and plural plate-like lead terminals 12 protruding in a straight line shape from one surface (bottom surface) of the relay main body 11. In FIG. 12, the relay main body 11 is not illustrated in a cross-sectional view for the purpose of simplification of the drawing and only the plural lead terminals 12 are illustrated in a cross-sectional view.

Such a type of relay is assembled into a resinous holding member 15, which holds terminal fittings 14 connected to electrical wires 13, to constitute a relay module. The relay module is assembled into an electrical junction box. Each terminal fitting 14 is provided with a spring portion 16 to which the lead terminal 12 is connected. The relay is held by the holding member 15 by inserting tips of the plural lead terminals 12 into the spring portions 16.

In the relay module illustrated in FIG. 12, water is prevented from entering a space which is surrounded by the relay main body 11 and the holding member 15, that is, a space for receiving the lead terminals 12, by bringing the relay main body 11 into contact with end faces of the holding member 15. However, when a slight gap is formed in a part in which the relay main body 11 comes in contact with the holding member 15 for some reasons, there is a possibility that water will enter the space through the gap and the water will come in contact with the lead terminals 12. Even when water comes in contact with the lead terminals 12 in this way, there is a need for satisfactorily preventing a short circuit between the lead terminals 12.

SUMMARY OF THE INVENTION

An object of the present invention is to prevent a short circuit between lead terminals of an electronic component.

In order to solve the above mentioned problem, an assembling structure of an electronic component according to one aspect of the present invention includes an electronic component configured to include a component main body having a rectangular parallelepiped shape and a plurality of lead terminals protruding from side surfaces of the component main body; and a housing member in which the electronic component is inserted and accommodated and configured to hold a plurality of terminal fittings connected to the lead terminals, wherein each lead terminal includes a base end protruding from at least one side surface of the component main body and a connecting portion which is connected to the base end and which droops along the side surface, and the plurality of lead terminals are provided to be protruded from at least one side surface of the component main body in the width direction of the side surface, the housing member includes a first housing chamber which guides and accommodates the component main body and a second housing chamber which accommodates and holds the terminal fittings connected to the connecting portion, the first housing chamber is formed to be surrounded with wall portions rising upright from a bottom wall from four directions, and the second housing chamber is formed outside the wall portions of the first housing chamber, the side surface of the component main body, on which the plurality of lead terminals is provided, is provided with an insulating member protruding along at least one side surface of opposite side surfaces of the neighboring base ends, and the insulating member is formed in the thickness direction of the side surface of the base ends, and the electronic component, the terminal fittings, and the housing member are mutually assembled.

Specifically, it is possible to configure that the insulating member is formed so as to surround the base ends.

In this way, since the area to be exposed from the housing member of the component main body can be reduced by receiving the electronic component including the lead terminals which droop along a side surface of the component main body in the housing member in which the component main body and the lead terminals are accommodated separately, it is possible to suppress attachment of water to the electronic component. Since a short circuit distance between the neighboring lead terminals can be substantially extended by providing the insulating member along the opposite surfaces of the neighboring lead terminals of the electronic component and forming the insulating member in the thickness direction of the side surface of the base end, that is, in the insertion direction of the electronic component, it is possible to prevent a short circuit between the lead terminals.

In this case, it is possible to configure that the second housing chamber is provided with an insulating partition wall which partitions the opposite side surfaces of the neighboring lead terminals.

According to this configuration, for example, since water attached to the insulating member which is formed along one base end of the neighboring base ends can be made to difficult to be transmitted to the other base end, it is possible to more satisfactorily prevent a short circuit between the lead terminals.

Further, it is possible to configure that an insertion opening of the housing member into which the electronic component is inserted is covered with a cover member, and the cover member is detachably formed in the housing member.

Since the electronic component can be completely surrounded with the housing member and the cover member by mounting the cover member on the housing member in this way, it is possible to enhance waterproof characteristics of the housing member and thus to suppress attachment of water to the electronic component.

By providing the electrical junction box with the assembling structure of an electronic component having this configuration, it is possible to enhance waterproof characteristics of the electrical junction box and thus to enhance electrical reliability of the electrical junction box.

Further, in order to solve the above mentioned problem, an electronic component according to another aspect of the present invention includes a component main body having a rectangular parallelepiped shape; and a plurality of lead terminals protruding from the component main body, wherein each lead terminal includes a base end protruding from at least one side surface of the component main body and a connecting portion which is connected to the base end and which droops along the side surface, and the plurality of lead terminals are provided on at least one side surface of the component main body in the width direction of the side surface, and the side surface of the component main body, on which the plurality of lead terminals is provided, is provided with a pair of plate-like insulating members protruding along opposite side surfaces of the neighboring base ends, and the pair of insulating members is formed in the thickness direction of the side surfaces of the base ends, is further connected to end portions in the thickness direction, and is formed in the width direction along end faces opposite to tips of the connecting portions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an assembling structure of an electronic component according to the present invention will be described with reference to the accompanying drawings. In this embodiment, a relay module in which a relay is used as an electronic component and the relay is accommodated in a housing member will be described, but it is obvious that the assembling structure of an electronic component according to the present invention can be applied to electronic components other than the relay.

The usage of the relay module according to this embodiment is not particularly limited, but a case can be considered in which the relay module is used for equipment or the like for controlling a connection state between a power supply device and an electric component in a mobile object such as an automobile. Specifically, for example, it can be considered that the relay module is introduced into an electrical junction box (junction box) disposed between an electric component and a battery which are mounted on an automobile and is used as a relay module for controlling input and cutoff of power. Such a type of relay module may be integrally formed with the electrical junction box, but may be formed as an independent body.

Figure 1:
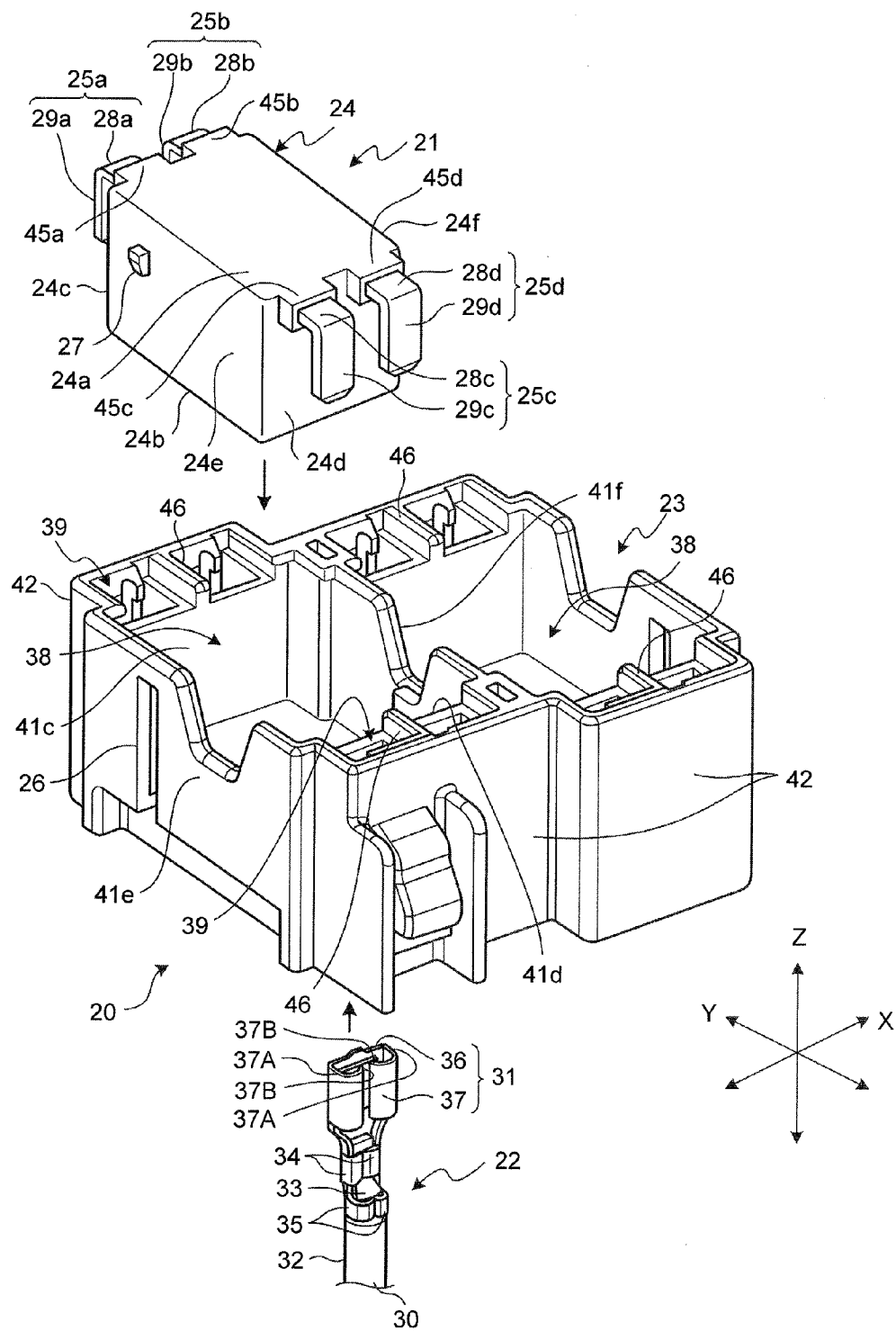
FIG. 1 is an assembly diagram of a relay module according to an embodiment.

FIG. 1 is an assembly diagram of a relay module according to an embodiment.

Figure 2:
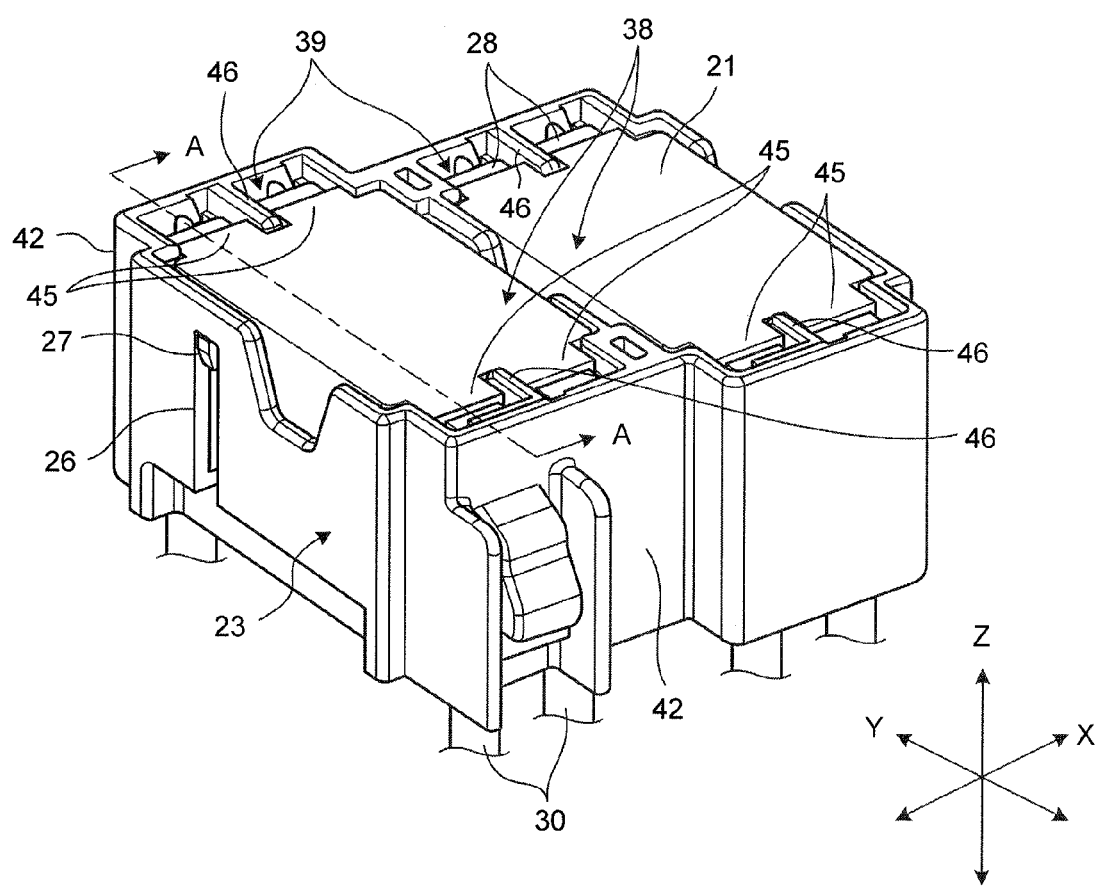
FIG. 2 is a diagram illustrating the entire configuration of the relay module illustrated in FIG. 1.

FIG. 2 is a diagram illustrating the entire configuration of the relay module illustrated in FIG. 1.

Figure 3:
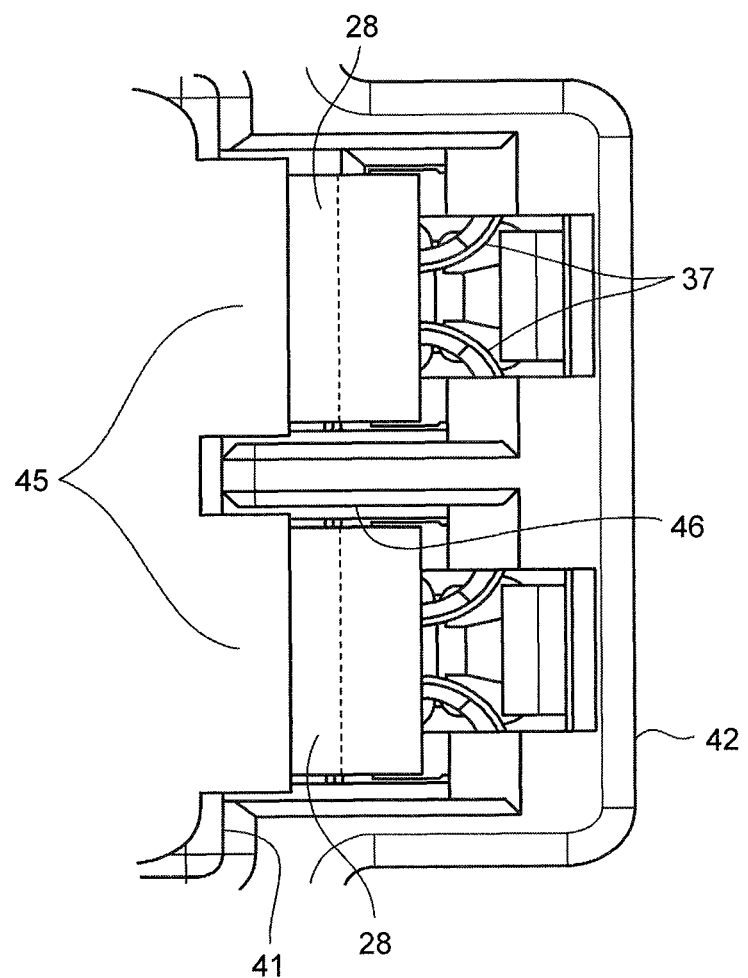
FIG. 3 is an enlarged top view illustrating the vicinity of a lead terminal illustrated in FIG. 2.

FIG. 3 is an enlarged top view illustrating the vicinity of a lead terminal illustrated in FIG. 2.

In the following description, a direction indicated by arrow X in FIG. 1 is defined as front-back direction, a direction indicated by arrow Y is defined as a right-left direction, and a direction indicated by arrow Z is defined as an up-down direction (hereinafter, the same applies to the drawings other than FIG. 1). However, the up-down direction, the right-left direction, and the front-back direction may not necessarily match the respective directions in a state in which a relay module 20 is actually mounted on a mobile object.

As illustrated in FIG. 1, the relay module 20 according to this embodiment has a configuration in which a relay 21, terminal fittings 22, and a housing member 23 are mutually assembled. In this embodiment, it is assumed that one relay module 20 includes two relays 21. However, the number of relays constituting one relay module is not limited to two and the relay module may include only one relay or may include three or more relays. When the relay module includes plural relays, relays 21 having the same configuration as illustrated in FIG. 1 may be employed or relays having other configurations (for example, FIGS. 8 to 11) may be mixed.

Each relay 21 includes a relay main body 24 which is a component main body having a rectangular parallelepiped shape and which is formed of a resin or the like, and four plate-like lead terminals 25 which protrude from the relay main body 24. The relay main body 24 has surfaces facing each other in the up-down direction (hereinafter, referred to as a upper end surface 24a and a bottom surface 24b), surfaces facing each other in the right-left direction (hereinafter, referred to as a left side surface 24c and a right side surface 24d), and surfaces facing each other in the front-back direction (hereinafter, referred to as a front surface 24e and a back surface 24f). The relay main body 24 according to the embodiment has a rectangular parallelepiped shape which is long in the right-left direction and four surfaces of the left side surface 24c, the right side surface 24d, the front surface 24e, and the back surface 24f are side surfaces. The front surface 24e is provided with a locking protrusion 27 which engages with a penetration groove 26 formed in the housing member 23 as will be described later. The relay main body 24 may be formed in a square parallelepiped shape. The relay main body is not limited to this shape, but may be formed in a shape in which a side surface portion (or a peripheral surface portion) can be formed in the fitting direction, such as a cylindrical shape, a polygonal pillar shape, and a cylindrical tube shape.

Each lead terminal 25 includes a plate-like base end 28 protruding from at least one surface of the relay main body 24 and a plate-like connecting portion 29 extending from the base end 28. Lead terminals 25a and 25b include base ends 28a and 28b perpendicularly protruding from the left side surface 24c of the relay main body 24 with a gap therebetween in the front-back direction (width direction) of FIG. 1, and connecting portions 29a and 29b which droop along the left side surface 24c in the insertion direction of the relay 21 into the housing member 23 (the direction of an arrow in FIG. 1) with a predetermined gap from the left side surface 24c of the relay main body 24 by perpendicularly bending the base ends 28a and 28b. On the other hand, the lead terminals 25c and 25d include base ends 28c and 28d perpendicularly protruding from the right side surface 24d of the relay main body 24 with a gap therebetween in the front-back direction (width direction) of FIG. 1, and connecting portions 29c and 29d which droop along the right side surface 24d in the insertion direction of the relay 21 with a predetermined gap from the right side surface 24d of the relay main body 24 by perpendicularly bending the base ends 28c and 28d.

The base ends 28a to 28d protrude in parallel to the upper end surface 24a and the bottom surface 24b of the relay main body 24, and the protruding position is set to the same position below the upper end surface 24a of the relay main body 24. On the other hand, the connecting portions 29a to 29d extend in parallel with the insertion direction of the relay 21 and the distances thereof from the opposite side surfaces of the relay main body 24 are set to the same. In the connecting portions 29a to 29d, the height positions (position in the up-down direction) of the tips (lower ends) thereof are the same height position above the bottom surface 24b of the relay main body 24 in the insertion direction of the relay 21 (the up-down direction indicated by arrow Z). In other words, the height positions thereof are set such that the tips of the connecting portions 29a to 29d do not protrude downward from a plane including the bottom surface 24b of the relay main body 24. In the lead terminals 25a to 25d, the widths in the front-back direction of the base ends 28a to 28d and the connecting portions 29a to 29d are set to the same size.

Regarding the lead terminals 25a to 25d according to this embodiment, each of two side surfaces 24c and 24d of the relay main body 24 is provide with two lead terminals, but at least one side surface of the side surfaces 24c to 24f only has to be provided with plural lead terminals. The plural lead terminals 25 are arranged with a predetermined gap therebetween in the width direction of the side surface of the relay main body 24, that is, a direction (for example, the front-back direction perpendicular to the insertion direction of the relay 21 [corresponding to the direction indicated by arrow X] as in this embodiment) intersecting the insertion direction of the relay 21 (the up-down direction indicated by arrow Z).

The terminal fitting 22 is an interface member that is connected to a terminal portion of an electrical wire 30 so as to electrically connect the electrical wire 30 to the relay 21. The terminal fitting 22 is formed by machining a conductive metal sheet and includes a female fitting portion 31 to which the connecting portion 29 of the lead terminal 25 is connected (fitted), a pair of core clamping pieces 34 that caulk a core wire 33 exposed by peeling an insulating coating 32 of the terminal portion of the electrical wire 30, and a pair of external clamping pieces 35 that caulk a tip of the insulating coating of the electrical wire 30.

The fitting portion 31 includes a flat plate portion 36 that supports the connecting portion 29 of the lead terminal 25 to be fitted and a spring portion 37 that presses the connecting portion 29 and is configured to fit and support the connecting portion 29, which is pressed against the plate portion 36 by the spring portion 37, between the plate portion 36 and the spring portion 37. The spring portion 37 is formed in a pair of convex shapes by causing both ends in the front-back direction of the plate portion 36 to rise upright and curving the tips thereof toward the vicinity of the center in the front-back direction of the plate portion 36. That is, the spring portion 37 applies a pressing force (elastic restoration force) to the connecting portion 29 to support the connecting portion 29 by elastically deforming the tips thereof in a direction in which it is separated from the plate portion 36.

The fitting portion 31 has a tapered shape (tapered surface) in which a upper end surface 37A of the spring portion 37 is gradually inclined downward from a portion in which the spring portion 37 most protrudes upward from the plate portion 36 (portion connected to the plate portion 36) to a position at which a tip 37B of the spring portion 37 faces the plate portion 36. Accordingly, when the connecting portion 29 of the lead terminal 25 is fitted to the fitting portion 31, the connecting portion 29 can be guided by the tapered surface of the spring portion 37 and can be smoothly inserted into the fitting portion 31.

FIG. 1 illustrates an example of the terminal fitting 22 in which the fitting portion 31 is called a fastening type, but the terminal fitting 22 is not limited to this type. For example, the fitting portion 31 may be configured to have a rectangular tubular sectional shape, to provide the inside of the fitting portion 31 with a plate-like spring portion, and to press the connecting portion 29 of the lead terminal 25 against the inner wall of the fitting portion 31 with the spring portion.

The housing member 23 is a resinous casing for accommodating and holding the relay 21 and the terminal fittings 22 and includes a first housing chamber 38 that guides and accommodates the relay main body 24 therein and a second housing chamber 39 that accommodates and holds the terminal fittings 22 therein. In this embodiment, the housing member 23 is treated as a single member independent of the electrical junction box. However, the housing member 23 may be formed as a part of a casing which is formed in the electrical junction box and may be formed as a unified body with the electrical junction box.

As illustrated in FIG. 1, two first housing chambers 38 are formed in the housing member 23 according to this embodiment, and a pair of second housing chambers 39 is arranged to face each other with the first housing chamber 38 interposed therebetween. That is, the housing member 23 includes two sets of housing spaces including one first housing chamber 38 and two second housing chambers 39.

In the second housing chamber 39, two terminal fittings 22 are accommodated at predetermined positions to correspond to the lead terminals 25 of the relay 21 which is inserted into each housing space.

Figure 4:
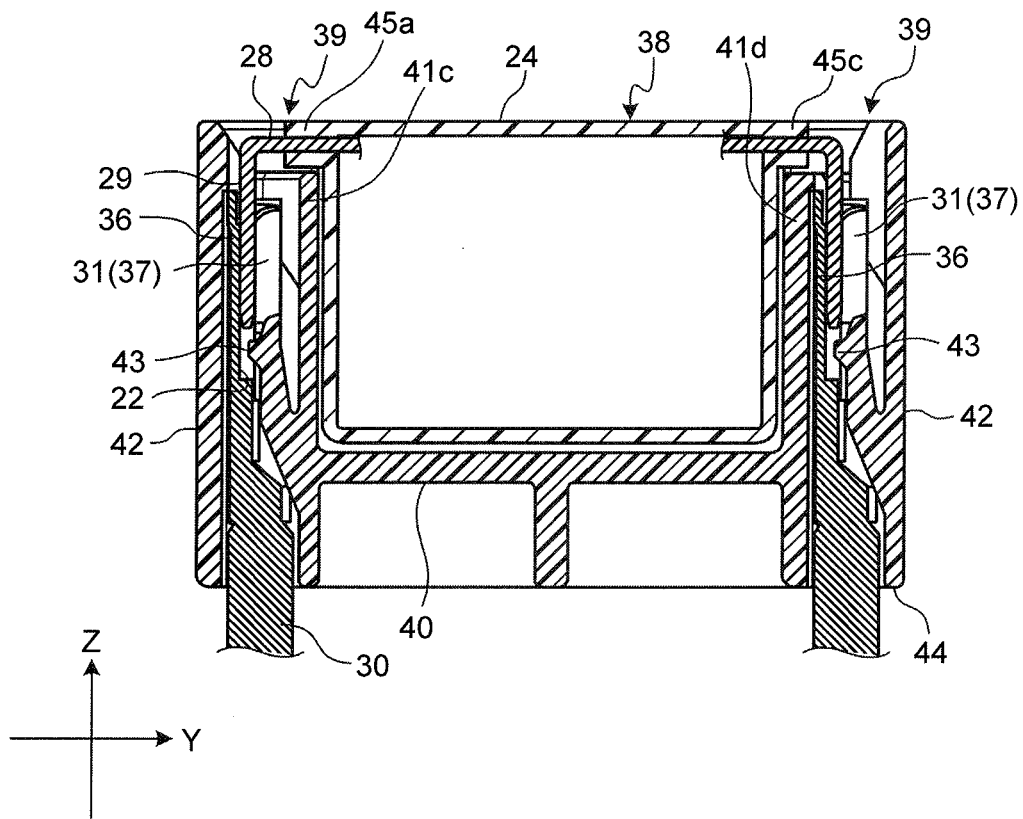
FIG. 4 is a longitudinal-cross-sectional view taken along arrow A-A of FIG. 2.

FIG. 4 is a longitudinal-sectional view taken along arrow A-A of FIG. 2.

In FIG. 4, the internal structure of the relay main body 24 is not illustrated for the purpose of simplification of the drawing.

As illustrated in FIG. 4, the first housing chamber 38 is surrounded with a bottom wall 40 and wall portions 41 rising upright from the bottom wall 40 to form a concave space of which the top is opened to the outside. The wall portions 41 rise upright from the bottom wall 40 so as to surround the side surfaces (the left side surface 24c, the right side surface 24d, the front surface 24e, and the back surface 24f) of the relay main body 24 from four directions and guide and accommodate the relay main body 24 to the first housing chamber 38. The first housing chamber 38 is formed in a rectangular parallelepiped shape which is slightly larger than the relay main body 24, smoothly accommodates the relay main body 24 guided by the wall portions 41 therein, and holds the posture of the relay main body 24 by causing four side surfaces of the accommodated relay main body 24 to interfere with the wall portions 41.

As illustrated in FIG. 1, a penetration groove 26 directing the first housing chamber 38 to the outside of the housing member 23 is formed in a wall portion 41e (the wall portion facing the front surface 24e of the relay main body 24) other than a wall portion 41f partitioning the neighboring first housing chambers 38 and two wall portions 41c and 41d as partition walls from the second housing chamber 39 among the four wall portions 41 forming the first housing chamber 38 so as to extend in the height direction of the wall portion 41e (the insertion direction of the relay main body 24). The upper end portion of the penetration groove 26 is configured to be able to lock a locking protrusion 27 protruding from one side surface of the relay main body 24 when the relay main body 24 is accommodated in the first housing chamber 38.

The second housing chambers 39 are disposed outside the wall portions 41c and 41d (hereinafter, abbreviated as wall portions 41) of the first housing chamber 38, that is, on the opposite sides of the first housing chamber 38 with the wall portions 41c and 41d interposed therebetween, and are surrounded with a rectangular tubular frame formed by the wall portions 41 and a frame portion 42 of the housing member 23 to form a rectangular parallelepiped space of which the upper end portion and the bottom portion are opened to the outside. The second housing chambers 39 are provided with lances 43 (locking pieces) for holding the terminal fittings 22 as illustrated in FIG. 4. Each lance 43 is integrally molded to extend in a cantilever shape from the wall portions 41 or the frame portion 42 to the second housing chamber 39 so as to be elastically deformed.

In FIG. 4, the lance 43 located on the left side is drawn from the wall portion 41c, and the lance 43 located on the right side is drawn from the frame portion 42. Accordingly, each lance 43 forms a so-called spring mechanism, and presses and locks the lower edge of the spring portion 37 of the terminal fitting 22 with a restoration force for restoration from the elastic deformation. As a result, fixation of the terminal fitting 22 to the second housing chamber 39 is achieved and the terminal fitting 22 is held in the second housing chamber 39. In this embodiment, the right and left lances 43 are formed to extend in the same direction, but may extend in opposite directions so as to be symmetric.

In order to accommodate the terminal fittings 22 in the second housing chamber 39 and to hold the terminal fittings using the lances 43, the terminal fittings 22 are inserted from openings 44 on the bottom of the second housing chamber 39. Then, each terminal fitting 22 is inserted into the second housing chamber 39 until the tip (fitting portion 31) of the terminal fitting 22 comes in contact with the lance 43. When an upward force (insertion force) in FIG. 4 is applied to the terminal fitting 22 so as to further insert the terminal fitting 22 into the second housing chamber 39 in the state in which the tip (the fitting portion 31) of the terminal fitting 22 comes in contact with the lance 43, the lance 43 is pressed by the terminal fitting 22 and is elastically deformed. In FIG. 4, the lance 43 located on the left side is elastically deformed to get close to the wall portion 41 (the wall portion 41c) and the lance 43 located on the right side is elastically deformed to get close to the frame portion 42. When an insertion force is applied to the terminal fitting 22 against the restoration force of the elastic deformation, the terminal fitting 22 moves upward in a state in which the lance 43 is in sliding contact with the fitting portion 31. When the terminal fitting 22 moves and the lance 43 relatively reaches the lower edge of the spring portion 37 along the fitting portion 31, the lance 43 is elastically deformed and engages with the lower edge of the spring portion 37. By causing the lance 43 to engage with (the lower edge of the spring portion 37 of) the terminal fitting 22 in this way, the terminal fitting 22 is locked to the lance 43. Accordingly, it is possible to prevent the terminal fitting 22 from getting out of the second housing chamber 39. That is, the terminal fitting 22 is held in the second housing chamber 39.

On the other hand, in this embodiment, the position in the up-down direction (the direction indicated by arrow Z) of the relay 21 in a state in which the relay 21 is accommodated in the housing member 23, that is, when the connecting portion 29 of the lead terminal 25 is fitted to the spring portion 37 of the terminal fitting 22, is set to a predetermined height position such that (the upper surface 24a of) the relay main body 24 does not protrude from the top of the housing member 23 as illustrated in FIGS. 2 and 4. Here, the position in the up-down direction (height position) of the relay main body 24 is determined depending on the position at which the connecting portion 29 of the lead terminal 25 is fitted to the spring portion 37 of the terminal fitting 22. That is, in the second housing chamber 39, each terminal fitting 22 is held at the position in the up-down direction (height position) at which the spring portion 37 holding the connecting portion 29 of the lead terminal 25 faces the side surface of the relay main body 24 accommodated in the first housing chamber 38 with the wall portion 41 interposed therebetween. The top end face of the wall portion 41 does not contact with the base end 28 of the lead terminal 25 when the connecting portion 29 of the lead terminal 25 is fitted to the spring portion 37 of the terminal fitting 22. That is, the top end face of the wall portion 41 is disposed at a predetermined position in the up-down direction (height position) below the top end face of the housing member 23. The bottom wall 40 is disposed at a predetermined position in the up-down direction (height position) at which the bottom wall does not contact with the bottom surface 24b of the relay main body 24. Accordingly, except for the portions in which the connecting portions 29 of the lead terminals 25 are fitted to the spring portions 37 of the terminal fittings 22, the relay 21 is held in the housing member 23 without interfering with the bottom wall 40 or the top end face of the wall portion 41 in the up-down direction (height direction) of the housing member 23. Accordingly, it is possible to satisfactorily bring the lead terminals 25 into contact with the terminal fittings 22 and thus to stabilize a holding force of the relay 21.

When the relay 21 is assembled into the housing member 23 having the above-mentioned configuration, the relay main body 24 is guided along the wall portions 41 and is inserted into the first housing chamber 38 while bringing the relay main body 24 into contact with the wall portions 41 of the first housing chamber 38 to stabilize the posture such that the relay 21 is not excessively inclined with respect to the first housing chamber 38. When the vicinity of the lower end of the relay main body 24 is accommodated in the first housing chamber 38, the tips (lower ends) of the connecting portions 29 of the lead terminals 25 are positioned to face the fitting portions 31 above the terminal fittings 22. When the relay main body 24 is inserted to the vicinity of the bottom wall 40 of the first housing chamber 38 in the state in which the connecting portions 29 are positioned in this way, the connecting portions 29 are inserted into the gaps between the plate portion 36 and the spring portion 37 in each fitting portion 31. The connecting portions 29, that is, the relay 21, are fitted and supported with the pressing force of the spring portions 37. In the relay module 20 assembled in this way, as illustrated in FIGS. 2 and 4, the relay 21 is held in the housing member 23 and the relay 21 is electrically connected to the electrical wire 30 via the terminal fittings 22.

The electrical junction box is generally configured such that water (liquid) does not enter the inside thereof. However, there is a possibility that water will be attached to the relay module 20, for example, when the cover of the electrical junction box is opened for maintenance or due to dew condensation. That is, in the relay 21, four side surfaces 24c to 24f and the bottom surface 24b of the relay main body 24 are surrounded with the wall of the first housing chamber 38, but the upper end surface 24a is exposed. Accordingly, there is a possibility that water will be attached thereto. Particularly, it cannot be said that the upper surface 24a of the relay 21 accommodated in the electrical junction box is located on the upper side (the cover side) in the vertical direction of the electrical junction box, and the relay may be disposed in a downward direction, in a state in which the upper surface 24a faces the side surface direction (a direction intersecting the vertical direction) of the electrical junction box. In this case, for example, there is a possibility that water attached to the upper surface 24a of the relay main body 24 or the housing member 23 will diffuse to the side surfaces 24c and 24d of the relay main body 24 by a gravitational force or a surface tension. However, as for the electrical junction box, even when water is attached to the side surfaces 24c and 24d in this way, there is a need for preventing a short circuit between the neighboring lead terminals 25 (between the base end 28a and the base end 28b and between the base end 28c and the base end 28d).

In this embodiment, in order to prevent a short circuit between the neighboring lead terminals 25, an insulating members 45 (45a to 45d) protrude along the opposite side surfaces of the neighboring base ends 28 from the side surfaces of the relay main body 24 provided with the plural lead terminals 25. Specifically, as illustrated in FIG. 1, the insulating members 45a to 45d are formed along the upper and lower end surfaces and both side surfaces of the base ends 28a to 28d. The insulating members 45a to 45d are integrally formed with the relay main body 24 using a resin or the like so as to be flush with the upper surface 24a of the relay main body 24.

As illustrated in FIGS. 2 and 3, the second housing chamber 39 is provided with an insulating partition wall 46 partitioning the opposite side surfaces of the neighboring insulating members 45 in the thickness direction (up-down direction) of the insulating members in a state in which the relay 21 is accommodated in the housing member 23. The partition wall 46 is integrally formed over the frame portion 42 and the wall portions 41 so as to partition the second housing chamber 39 in the up-down direction. As illustrated in FIG. 2, the partition wall 46 is disposed between the neighboring insulating members 45 so as to be separated from the insulating members 45, and the top end portion thereof is set to be substantially flush with the upper surface 24a of the relay main body 24. The top end surface of the partition wall 46 is chamfered along the top end surface.

As in this embodiment, by providing the insulating members 45 along the opposite side surfaces of the neighboring base ends 28, water attached to the side surfaces 24c and 24d of the relay main body 24 does not cause a short circuit between the neighboring lead terminals 25 as long as the water moves along the insulating members 45. Therefore, since the insulating members 45 can substantially extend the short circuit distance between the lead terminals 25 due to water attached to the side surfaces 24c and 24d of the relay main body 24, it is possible to prevent a short circuit between the lead terminals 25. As in this embodiment, by coating the top end surfaces of the lead terminals 25 with the insulating members 45 (45a to 45d), it is possible to prevent troubles such as an electric shock or a short circuit between the lead terminals 25 due to contact of a finger or a tool with an electrified portion of the relay 21 assembled into the housing member 23. In addition, by surrounding the lead terminals 25 with the insulating members 45 (45a to 45d), it is possible to load a stress (reaction force) acting on the lead terminals 25 to the insulating members 45 to reduce the stress when inserting the lead terminals 25 into the terminal fittings 22. Accordingly, it is possible to prevent the lead terminals 25 from being deformed due to the stress at the time of insertion.

By providing the partition wall 46 in the gap between the neighboring insulating members 45, for example, water attached to one base end 28 or the insulating member 45 formed along the base end 28 can be prevented from being transmitted to the other base end 28 or the insulating member 45 formed along the other base end 28. Accordingly, by providing the partition wall 46 in this way, it is possible to prevent a short circuit between the lead terminals 25, for example, due to transmission and attachment of water between the neighboring insulating members 45.

Figure 5:
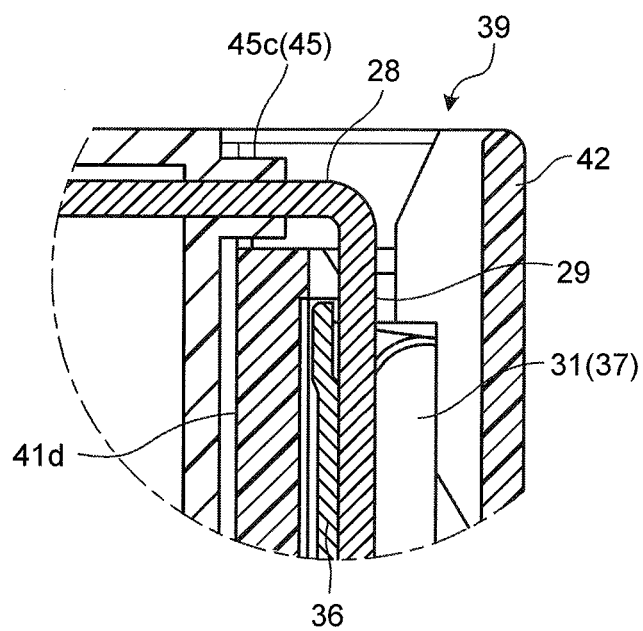
FIG. 5 is a cross-sectional view illustrating an insulating member according to another embodiment.

FIG. 5 is a cross-sectional view illustrating an insulating member according to another embodiment.

The insulating member 45 according to this embodiment can be formed integrally with the relay main body 24 by resin molding (for example, insert molding) at the time of manufacturing the relay 21. The length of the insulating member 45 along the base end 28 is not particularly limited. However, the greater the length extending of the insulating member 45 along the base end 28 becomes, the greater the short circuit distance between the lead terminals 25 can become. The insulating member 45 according to this embodiment is formed to be flush with the upper end surface 24a of the relay main body 24, but the insulating member 45 (insulating member 45c in FIG. 5) may be formed in a shape having a level difference as illustrated in FIG. 5. The insulating member 45 may be formed of an insulating material other than the insulating material used for molding the relay main body 24. In this embodiment, the insulating member 45 is formed in close contact with the base end 28, but the insulating member 45 may be formed to be separated from the base end 28.

The insulating members 45 (45a to 45d) in this embodiment are formed to surround each base end 28 from four directions, but are not limited to this example. The insulating member only has to be formed at least along the opposite side surfaces of the neighboring base ends 28.

Figure 8:
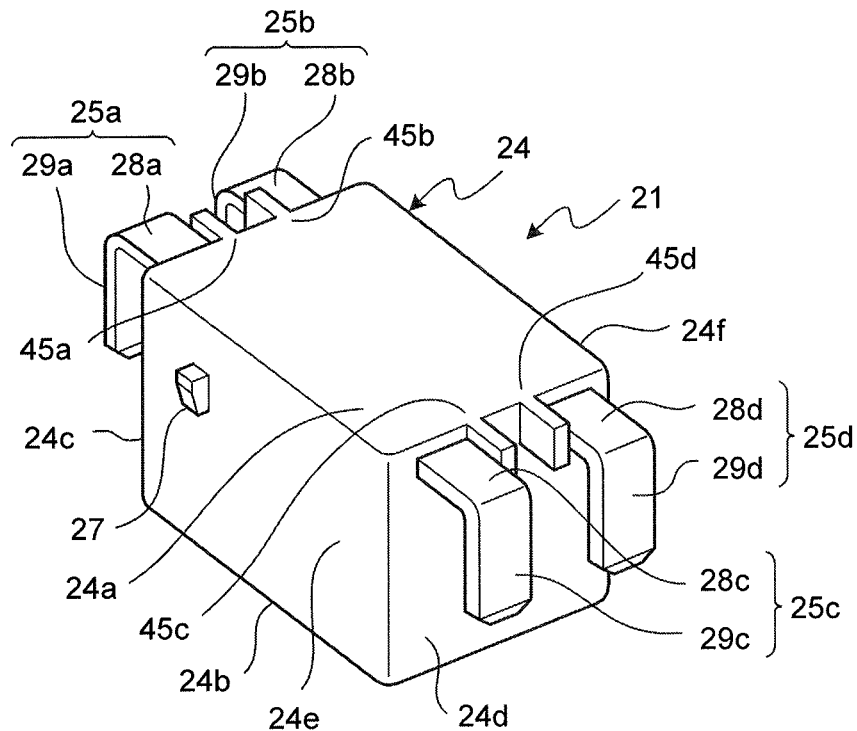
FIG. 8 is a perspective view illustrating an insulating member according to another embodiment.

FIG. 8 is a perspective view illustrating an insulating member according to another embodiment.

FIG. 8 illustrates an example in which a pair of plate-like insulating members 45 are formed along the opposite side surfaces of the neighboring base ends 28. In this case, the insulating members 45a to 45d are formed over at least the thickness direction (the insertion direction of the relay 21 which is the direction of arrow Z and the up-down direction in the drawing) of the side surfaces of the base ends 28a to 28d. That is, the insulating members 45 are formed to protrude upward from the top end surface of the base ends 28 and to protrude downward from the bottom end surface of the base ends 28. Each insulating member 45 may be formed in a substantially L shape by connecting a plate-like insulating member extending along any one of the top end surface and the bottom end surface of each base end 28 to the insulating members illustrated in FIG. 8, or may be formed in a substantially fallen U shape or a substantially U shape by connecting a plate-like insulating member extending along both the top end face and the bottom end face of each base end 28 to the insulating member illustrated in FIG. 8.

The insulating members 45 do not need to be formed along the opposite side surfaces of the neighboring base ends 28, respectively, as illustrated in FIGS. 1 and 8, and only have to be formed along the side surface of one base end 28. Here, the insulating member 45 is formed over the thickness direction (the direction of arrow Z which is the up-down direction) of the side surface of the base end 28. Even by employing this configuration, since the short circuit distance between the neighboring lead terminals 25 can be substantially extended, it is accordingly possible to prevent a short circuit between the lead terminals 25. In this case, the partition wall 46 is formed to be separated from the insulating member 45 and the side surface of the other base end 28.

An example in which the housing member 23 according to this embodiment is covered with another member to protect the relay 21 will be described below.

Figure 6:
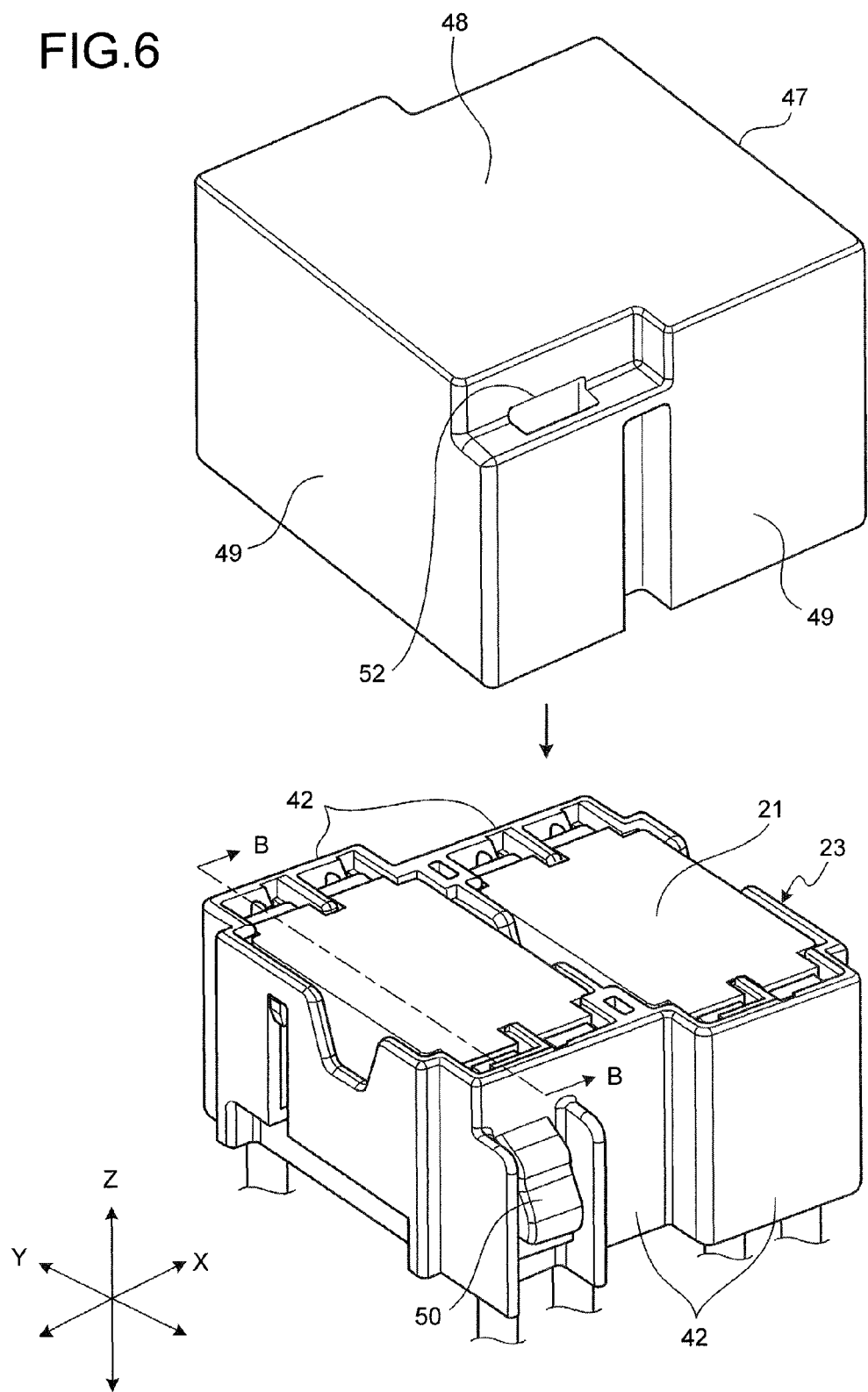
FIG. 6 is an assembly diagram illustrating assembling of a cover member into the relay module illustrated in FIG. 2.

FIG. 6 is an assembly diagram illustrating assembling of a cover member into the relay module illustrated in FIG. 2.

Figure 7:
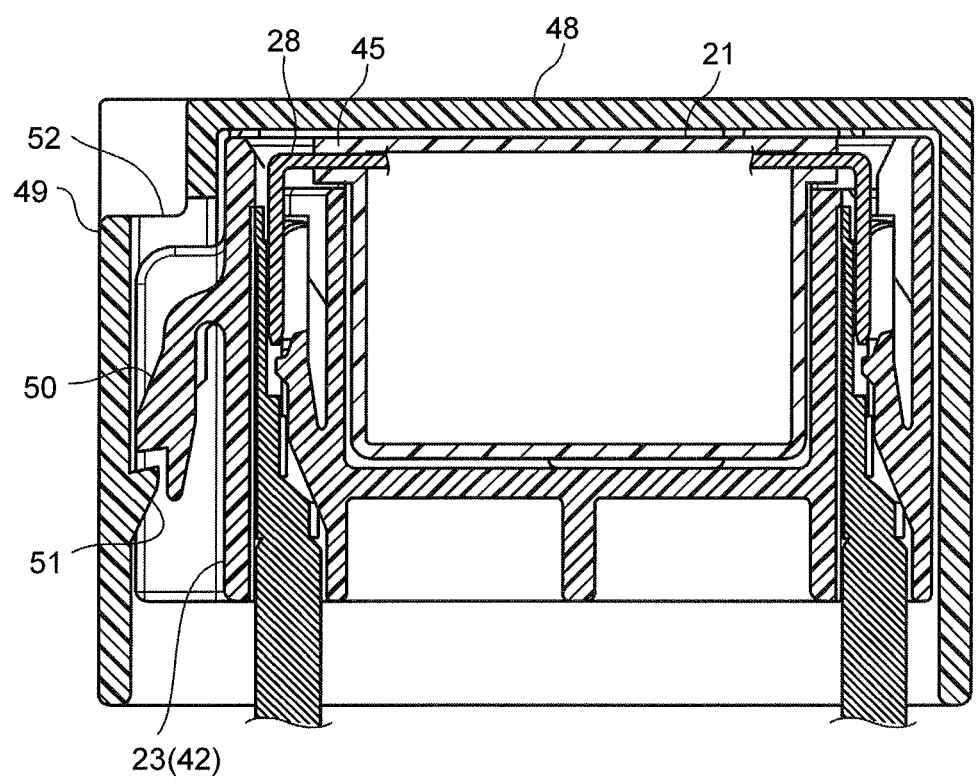
FIG. 7 is a longitudinal-sectional view taken along arrow B-B and illustrating a state in which the cover member illustrated in FIG. 6 is assembled.

FIG. 7 is a longitudinal-sectional view taken along arrow B-B in a state in which the cover member illustrated in FIG. 6 is assembled.

In FIG. 7, the internal structure of the relay main body 24 is not illustrated for the purpose of simplification of the drawing.

FIG. 6 is an assembly diagram illustrating assembling of the cover member covering the top of the housing member 23 having accommodated the relay 21. As illustrated in FIG. 6, the housing member 23 having accommodated the relay 21 is covered with a cover member 47 from the upper side thereof.

The cover member 47 is a box-like casing (lid member) formed of a resin and having an opening on the bottom, and forms a concave space which is surrounded with a top wall 48 and four wall portions 49 rising upright from the top wall 48 and of which the bottom is opened to the outside. The wall portions 49 are formed to rise upright from the top wall 48 so as to surround the housing member 23 from four directions and is configured to accommodate the housing member 23 in the space and to be detachably attached along the wall surfaces of the housing member 23.

The frame portion 42 of the housing member 23 is provided with a locking hook 50 which can be elastically deformed so as to protrude in a cantilever shape. On the other hand, the wall portion 49 of the cover member 47 facing the frame portion 42 is provided with a locking protrusion 51 (see FIG. 7) which is locked to the locking hook 50 so as to protrude when the cover member 47 is mounted on the housing member 23.

In assembling the cover member 47 into the housing member 23, the cover member 47 moves the lower side of the housing member 23 in a state in which the cover member 47 is mounted from the upper side of the housing member 23. At this time, the wall portions 49 of the cover member 47 are guided along the wall surfaces of the frame portion 42 of the housing member 23. When the locking protrusion 51 of the cover member 47 comes in contact with the locking hook 50 of the housing member 23, the locking hook 50 comes in sliding contact with the locking protrusion 51, is pressed by the locking protrusion 51, and is elastically deformed in a direction in which it approaches the frame portion 42 of the housing member 23. When the cover member 47 is further pressed inward and the locking protrusion 51 goes over the locking hook 50, the locking hook 50 is restored from the elastic deformation and the cover member 47 is locked to the housing member 23 in a state in which it is attached to the housing member 23.

On the other hand, in detaching the cover member 47 locked to the housing member 23 from the housing member 23, a tool is thrust from a tool insertion hole 52 formed in the cover member 47 and the tool is pressed against the locking hook 50 to elastically deform the locking hook in a direction in which it approaches the frame portion 42. Accordingly, the locked state between the locking hook 50 and the locking protrusion 51 can be released and the cover member 47 can be detached from the housing member 23. In this embodiment, the relay module 20 is provided with a set of locking hook 50 and locking protrusion 51, but this embodiment is not limited to this example as long as the structure can lock the cover member 47 to the housing member 23.

According to this embodiment, since the relay 21 can be covered with the housing member 23 and the cover member 47, it is possible to prevent water from being attached to the relay 21 (particularly, the relay main body 24). Accordingly, since the waterproof characteristic of the relay 21 can be improved, it is possible to more satisfactorily prevent a short circuit between the neighboring lead terminals 25. The cover member 47 is not limited to the box-like shape as illustrated in FIG. 6, but the shape thereof is not particularly limited as long as the shape covers at least an exposed portion of the relay 21 accommodated in the housing member 23.

The above-mentioned embodiments describe the configuration of the relay module 20 into which the relay 21 illustrated in FIG. 1 is assembled as the assembling structure of the electronic component according to the present invention. However, the configuration of the electronic component is not limited to this example, and may include a component main body having a rectangular parallelepiped shape (which includes a square parallelepiped shape) and lead terminals protruding from at least one surface of the component main body. Each lead terminal may include a base end protruding from at least one surface of the component main body and a connecting portion connected to the base end and drooping along the side surface with a gap from the side surface of the component main body. Plural lead terminals may be formed in the width direction of at least one side surface of the component main body along the side surface. The side surface of the component main body on which the plural lead terminals are formed may be provided with an insulating member protruding along at least one side surface among the opposite side surfaces of the neighboring base ends. The insulating member may be disposed over the thickness direction (direction parallel to the direction in which the connecting portion droops) of the side surface of the base end.

Figure 9:
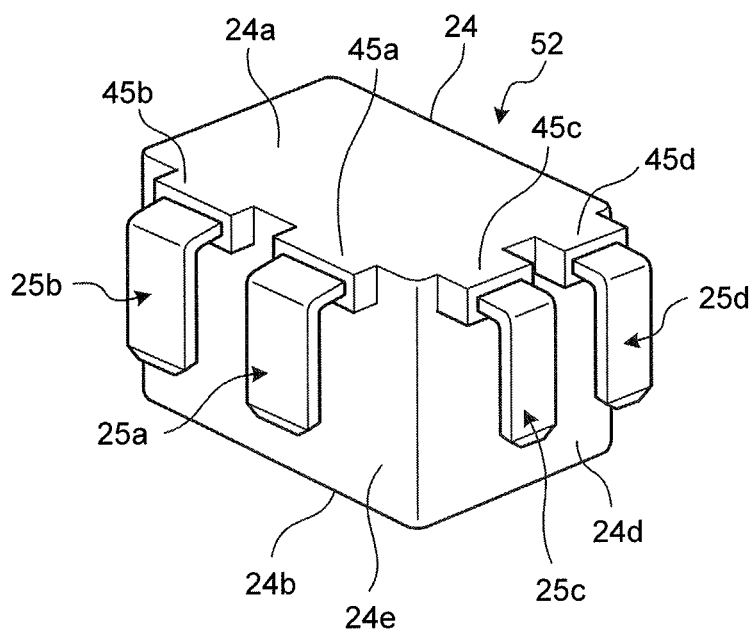
FIG. 9 is a perspective view illustrating a relay according to another embodiment.
Figure 10:
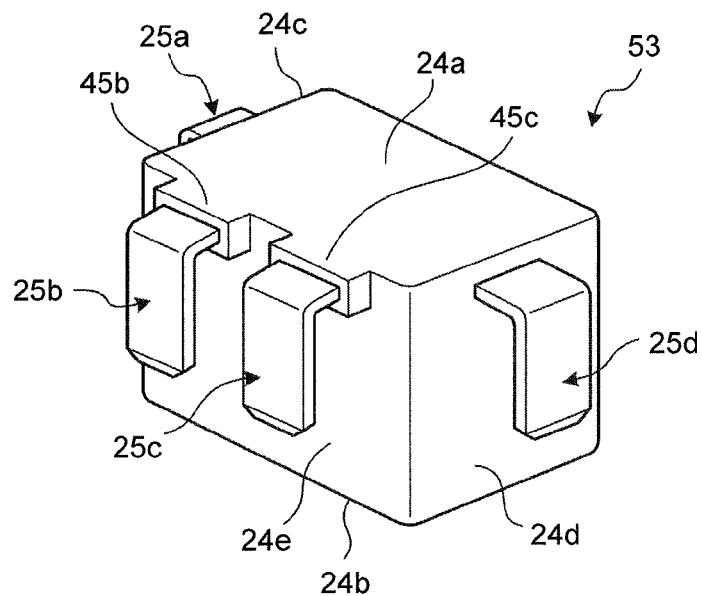
FIG. 10 is a perspective view illustrating a relay according to another embodiment.
Figure 11:
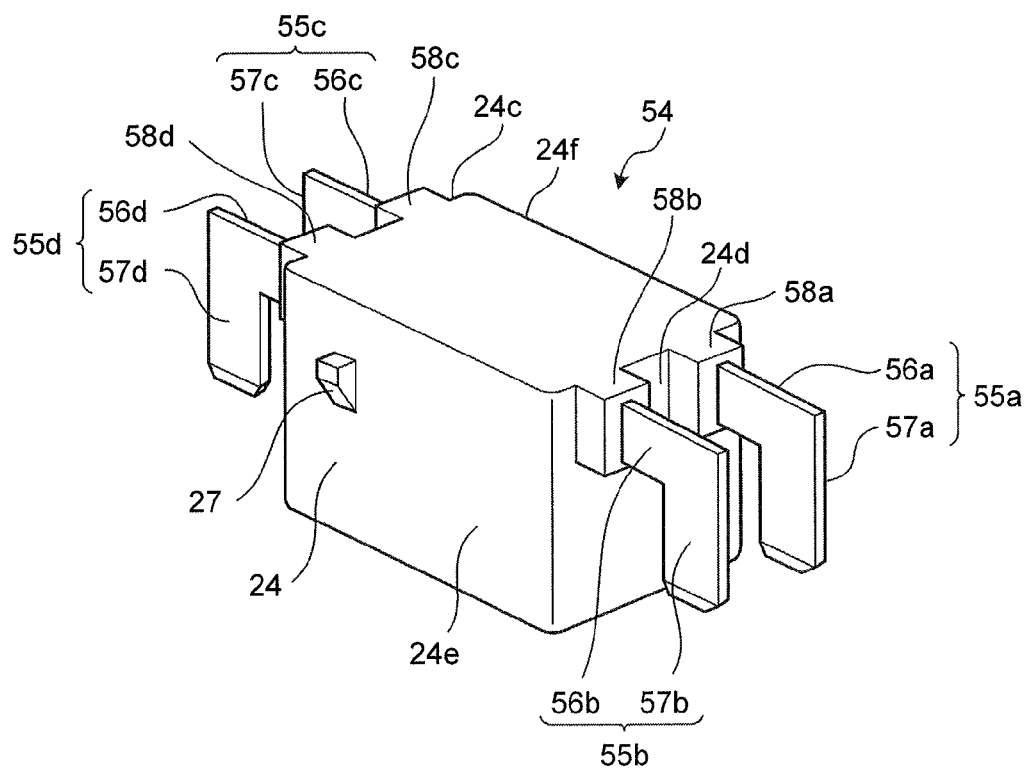
FIG. 11 is a perspective view illustrating a relay according to another embodiment.
Figure 12:
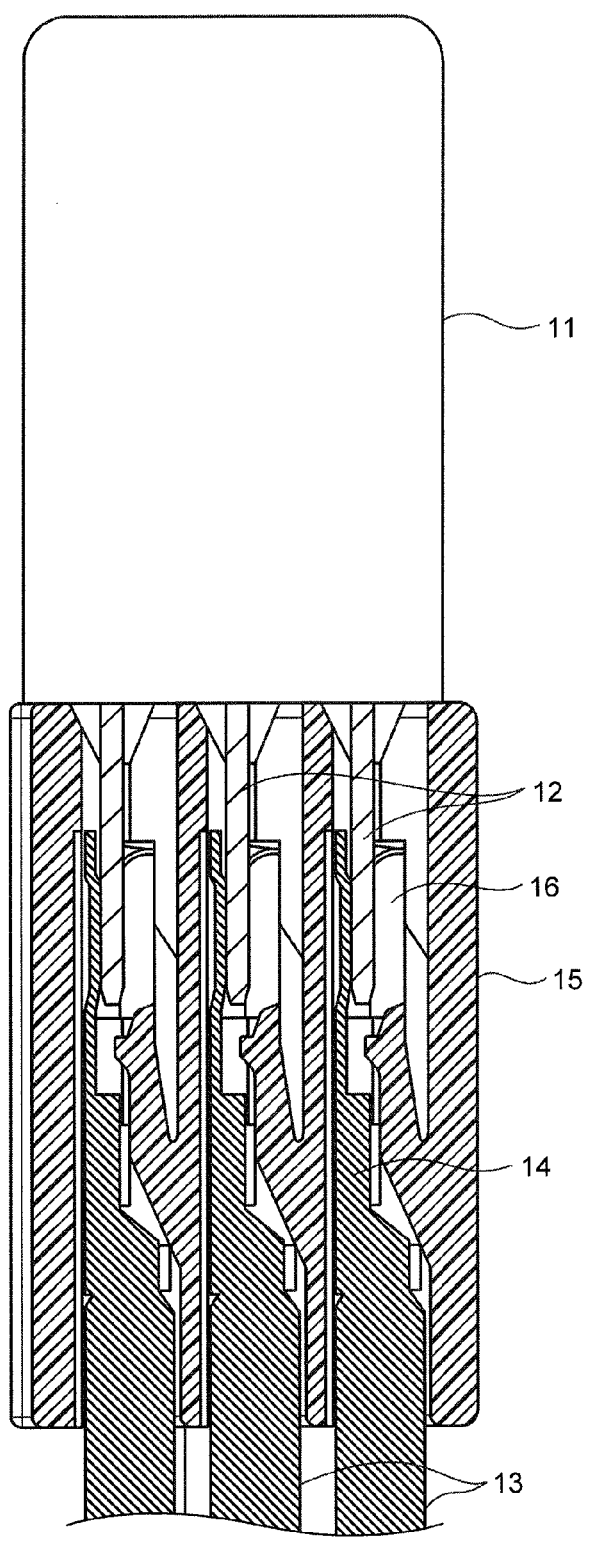
FIG. 12 is a longitudinal-sectional view of a conventional relay module.

More specifically, for example, even by employing electronic components (for example, relays) having different shapes illustrated in FIGS. 9 to 11, the same advantages as the relay illustrated in FIG. 1 can be achieved. Differences from that of the relay 21 illustrated in FIG. 1 will be described below.

FIG. 9 is a perspective view illustrating a relay having a different shape.

In the relay 21 illustrated in FIG. 1, each of a pair of parallel surfaces of the relay main body 24 is provided with two lead terminals 25. On the other hand, in a relay 52 illustrated in FIG. 9, each of two neighboring side surfaces (for example, the front surface 24e and the right side surface 24d) among four side surfaces other than the upper end surface 24a and the bottom surface 24b is provided with two lead terminals 25, and the relay main body 24 is provided with insulating members 45a to 45d to protrude so as to surround the base ends along the opposite side surfaces of the neighboring base ends of the lead terminals 25a to 25d. In this case, in the housing member accommodating the relay 52, two second housing chambers 39 are formed with the first housing chamber 38 and the wall portions 41 interposed therebetween to correspond to the arrangement of the lead terminals 25 and are disposed to be perpendicular to each other. The terminal fittings 22 corresponding to the number of lead terminals 25 are held in each second housing chamber 39 to correspond to the lead terminals 52 inserted in the second housing chamber.

FIG. 10 is a perspective view illustrating a relay having another different shape.

Like a relay 53 illustrated in FIG. 10, the lead terminals 25 may be formed on three side surfaces of the relay main body 24. In FIG. 10, one side surface 24e among the three side surfaces is provided with two lead terminals 25b and 25c and the other two side surfaces 24c and 24d are provided with the lead terminals 25a and 25d, respectively. In this case, the side surface 24e of the relay main body 24 on which two lead terminals 25 are disposed is provided with insulating members 45b and 45c to protrude so as to surround the base ends along the opposite side surfaces of the neighboring base ends of the lead terminals 25b and 25c. In the housing member accommodating the relay 53, three second housing chambers 39 are formed with the first housing chamber 38 and the wall portions 41 interposed therebetween to correspond to the arrangement of the lead terminals 25, and the terminal fittings 22 corresponding to the number of lead terminals 25 are held in the second housing chambers 39 to correspond to the lead terminals 25 inserted therein.

FIG. 11 is a perspective view illustrating a relay having another different shape.

In the above-mentioned relays, the thickness direction of the connecting portions 29 of the lead terminals 25 intersects (is perpendicular to) the side surfaces of the relay main body 24 facing the connecting portions 29, but lead terminals 55 may be formed such that the thickness direction thereof is parallel to the side surfaces of the relay main body 24 as illustrated in FIG. 11. In a relay 54 illustrated in FIG. 11, the base ends 56 and the connecting portions 57 of the lead terminals 55 are formed in a plate shape extending to be parallel to the front surface 24e and the back surface 24f of the relay main body 24, the thickness direction of connecting portions 57a and 57b of two lead terminals 55a and 55b is parallel to the side surface 24d of the relay main body 24, and the thickness direction of connecting portions 57c and 57d of the other two lead terminals 55c and 55d is parallel to the side surface 24c of the relay main body 24. As in other relays, each base end 56 protrudes perpendicularly from the corresponding side surface of the relay main body 24 and each connecting portion 57 extends in parallel with the corresponding side surface of the relay main body 24 with a gap from the side surface. In this case, the side surface 24c of the relay main body 24 is provided with insulating members 58c and 58d to protrude so as to surround the corresponding base ends 56 along the opposite side surfaces of neighboring base ends 56c and 56d of the lead terminals 55c and 55d. The side surface 24d of the relay main body 24 is provided with insulating members 58a and 58b to protrude so as to surround the corresponding base ends 56 along the opposite side surfaces of neighboring base ends 56a and 56b of the lead terminals 55a and 55b. In the accommodating member accommodating the relay 54, two second housing chambers 39 are formed to correspond to the arrangement of the lead terminals 55 with the first housing chamber 38 and the wall portions 41 interposed therebetween and are disposed to be parallel to each other. The terminal fittings 22 corresponding to the number of lead terminals 55 are arranged in the second housing chambers 39 to correspond to the lead terminals 55 inserted in the second housing chambers corresponding to the direction of the lead terminals 55.

Figure 13A:
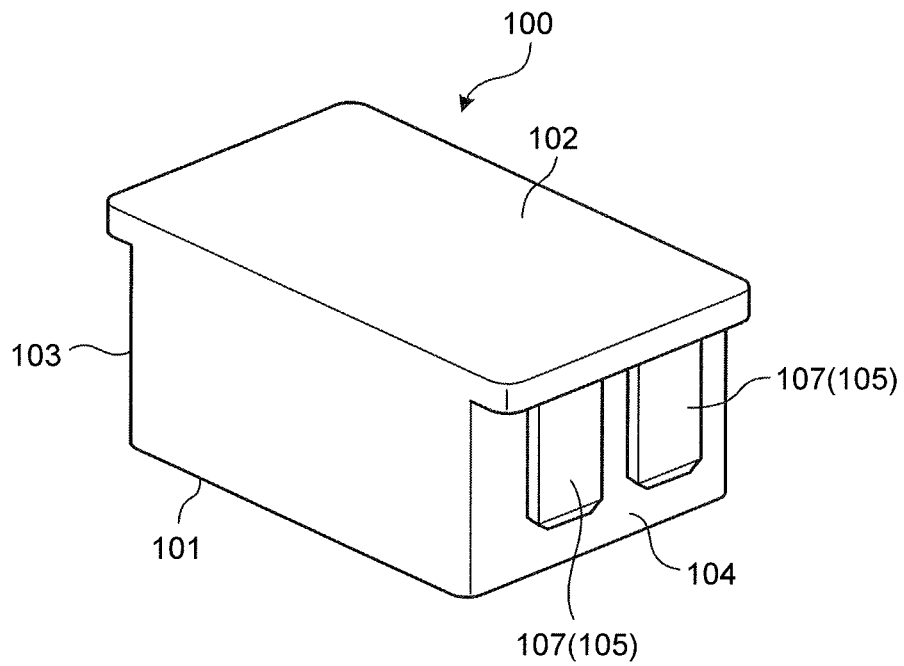
FIG. 13A is a perspective view illustrating an appearance of a relay in which a base end of a lead terminal is surrounded with a resin.

In the above-mentioned relays, the base ends of the lead terminals are completely exposed, but at least a part of each base end may be covered with a resin. FIG. 13A is a perspective view illustrating an appearance of a relay in which base ends of lead terminals are covered with a resin and FIG. 13B is a side view of the relay illustrated in FIG. 13A.

Figure 13B:
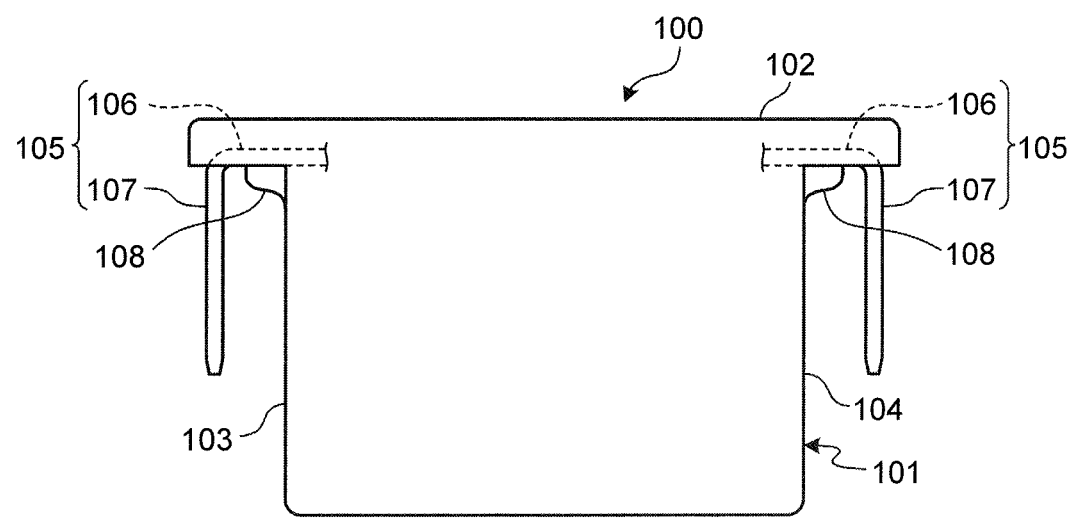
FIG. 13B is a side view of the relay illustrated in FIG. 13A.

As illustrated in FIGS. 13A and 13B, a plate-like insulating member 102 is assembled into a relay 100 along one surface (for example, surface corresponding to the upper end surface 24a in the embodiment) of a relay main body 101. The insulating member 102 is formed in a substantially rectangular shape in a plan view by molding an insulating resin. The insulating member 102 extends in a direction perpendicular to a pair of side surfaces 103 and 104 of the relay main body 101 which are disposed to face each other. Each of the side surfaces 103 and 104 is provided with two lead terminals 105. The lead terminals 105 are disposed such that contact portions 107 thereof face the side surfaces 103 and 104. The insulating member 102 is formed to cover base ends 106 of the lead terminals 105.

As illustrated in FIG. 13B, the base ends 106 of the lead terminal 105 are covered with the insulating member 102 in the axial direction thereof and the contact portions 107 of the lead terminals 105 are disposed to protrude from the bottom surface of the insulating member 102. Protrusions 108 are formed to have a level difference at positions at which the insulating member 102 and the side surfaces 103 and 104 intersect each other. The protrusions 108 come in contact with the upper end surface of the wall portion at the time of assembly of the relay 100 into the housing member. The base ends 106 of the lead terminals 105 may be disposed to protrude from the protrusions 108 or may be disposed to protrude from the side surfaces 103 and 104 of the relay main body 101.

According to this configuration, the base ends 106 of the lead terminals 105 can be supported from the upper side by the insulating member 102. Accordingly, since a load applied to the lead terminals 105 at the time of insertion of the lead terminals 105 into the terminal fittings can be greatly reduced, it is possible to prevent deformation of the lead terminals 105. As a result, it is possible to keep the electrical connection state between the lead terminals 105 and the terminal fittings good and to prevent a decrease in the holding force of the relay 100 to the housing member. By covering the base ends 106 of the lead terminals 105 with the insulating member 102, it is possible to prevent short-circuit between neighboring lead terminals 105.

While the embodiments of the present invention have been described in detail with reference to the drawings, the above-mentioned embodiments are only examples of the present invention and the present invention is not limited to the embodiments. Therefore, modifications in design or the like without departing from the gist of the present invention are included in the scope of the present invention.

For example, the embodiments have described the relay module using a relay as an electronic component, but the electronic component is not limited to the relay. The embodiments may be applied to other electronic components (a semiconductor device such as a transistor and an electronic component such as a sensor) as long as they include a component main body and lead terminals having configurations similar to the relay main body and the lead terminals according to the embodiments in appearance. Specifically, the embodiments may be applied to, for example, a control module or a fuse in which components such as an electronic circuit board are accommodated in a resinous case.

In the embodiments, the relay main body is formed, for example, in a rectangular parallelepiped shape, but is not limited to the shape. The body of the electronic component may be formed in a shape in which a side surface portion (or peripheral surface portion) is formed along the insertion direction (the direction of arrow Z), such as a cylindrical shape, a polygonal pillar shape, and a cylindrical tube shape.

According to the present invention, it is possible to prevent a short circuit between the lead terminals of the electronic component.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An assembling structure of an electronic component, comprising:
an electronic component configured to include a component main body having a rectangular parallelepiped shape and a plurality of lead terminals protruding from side surfaces of the component main body; and
a housing member in which the electronic component is inserted and accommodated and configured to hold a plurality of terminal fittings connected to the lead terminals, wherein
each lead terminal includes a base end protruding from at least one side surface of the component main body and a connecting portion which is connected to the base end and which droops along the side surface, and the plurality of lead terminals are provided to be protruded from at least one side surface of the component main body in the width direction of the side surface,
the housing member includes a first housing chamber which guides and accommodates the component main body and a second housing chamber which accommodates and holds the terminal fittings connected to the connecting portion, the first housing chamber is formed to be surrounded with wall portions rising upright from a bottom wall from four directions, and the second housing chamber is formed outside the wall portions of the first housing chamber,
the side surface of the component main body, on which the plurality of lead terminals is provided, is provided with an insulating member protruding along at least one side surface of opposite side surfaces of the neighboring base ends, and the insulating member is formed in the thickness direction of the side surface of the base ends, and
the electronic component, the terminal fittings, and the housing member are mutually assembled.

2. The assembling structure of the electronic component according to claim 1, wherein
the insulating member is formed so as to surround the base ends.

3. The assembling structure of the electronic component according to claim 1, wherein
the second housing chamber is provided with an insulating partition wall which partitions the opposite side surfaces of the neighboring lead terminals.

4. The assembling structure of the electronic component according to claim 2, wherein
the second housing chamber is provided with an insulating partition wall which partitions the opposite side surfaces of the neighboring lead terminals.

5. The assembling structure of the electronic component according to claim 1, wherein
an insertion opening of the housing member into which the electronic component is inserted is covered with a cover member, and the cover member is detachably formed in the housing member.

6. The assembling structure of the electronic component according to claim 2, wherein
an insertion opening of the housing member into which the electronic component is inserted is covered with a cover member, and the cover member is detachably formed in the housing member.

7. The assembling structure of the electronic component according to claim 3, wherein
an insertion opening of the housing member into which the electronic component is inserted is covered with a cover member, and the cover member is detachably formed in the housing member.

8. An electrical junction box comprising:
the assembling structure of the electronic component according to claim 1.

9. An electrical junction box comprising:
the assembling structure of the electronic component according to claim 2.

10. An electrical junction box comprising:
the assembling structure of the electronic component according to claim 3.

11. An electrical junction box comprising:
the assembling structure of the electronic component according to claim 5.

12. An electronic component comprising:
a component main body having a rectangular parallelepiped shape; and a plurality of lead terminals protruding from the component main body, wherein each lead terminal includes a base end protruding from at least one side surface of the component main body and a connecting portion which is connected to the base end and which droops along the side surface, and the plurality of lead terminals are provided on at least one side surface of the component main body in the width direction of the side surface, and the side surface of the component main body, on which the plurality of lead terminals is provided, is provided with a pair of plate-like insulating members protruding along opposite side surfaces of the neighboring base ends, and the pair of insulating members is formed in the thickness direction of the side surfaces of the base ends, is further connected to end portions in the thickness direction, and is formed in the width direction along end faces opposite to tips of the connecting portions.

\* \* \* \* \*